March 19, 1929.  J. C. MOODY  1,705,942
VALVE
Filed Feb. 4, 1928
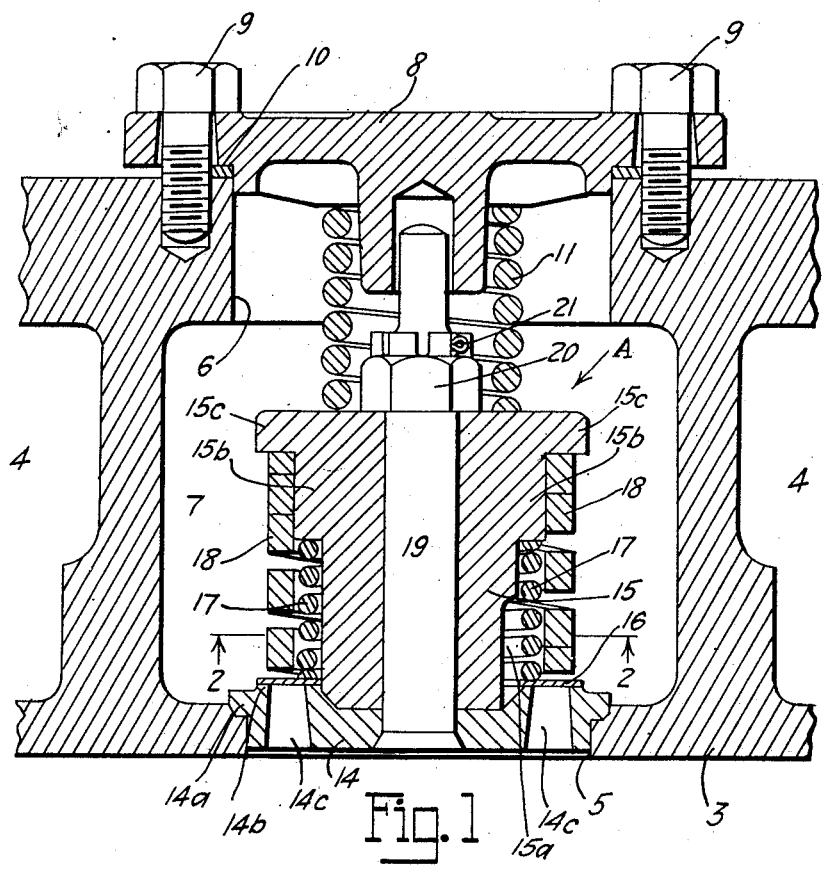
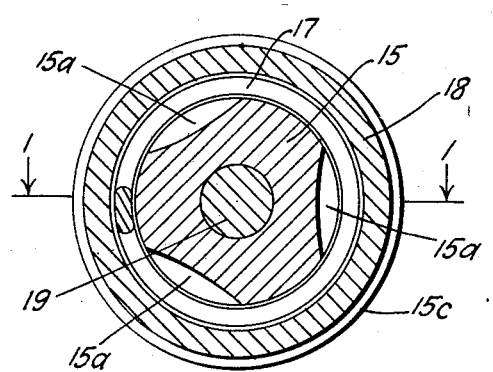
INVENTOR.
Julius C. Moody
BY
Ira L. Nickerson
ATTORNEY.

Patented Mar. 19, 1929.

1,705,942

UNITED STATES PATENT OFFICE.

JULIUS C. MOODY, OF FRANKLIN, PENNSYLVANIA, ASSIGNOR TO CHICAGO PNEUMATIC TOOL COMPANY, OF NEW YORK, N. Y., A CORPORATION OF NEW JERSEY.

VALVE.

Application filed February 4, 1928. Serial No. 251,809.

This invention relates to valve devices of the type used in pumps, compressors and similar machines and more particularly to valve assemblies adapted to be inserted as a unit. More specifically it concerns units of the described type in which the valve proper is of the wafer or plate type, and is in the nature of an improved valve unit such as disclosed in copending application Serial No. 164,148, filed January 28, 1927.

One object of the invention is to provide a simplified form of valve which is cheaper and easier to manufacture as well as more durable in service. Another object is to secure a freer and less obstructed movement of fluid through the valve when open. Other objects will be apparent from the detailed description which follows.

In order to illustrate the invention one concrete embodiment thereof is shown in the accompanying drawings in which:

Fig. 1 is a vertical sectional view through a portion of a machine of the described type showing a valve assembly embodying the invention mounted in a valve chamber of the machine, the assembly being in section substantially on the line 1—1 of Fig. 2: and Fig. 2 is a sectional view substantially on the line 2—2 of Fig. 1.

In Fig. 1 a fragmentary portion of the cylinder 3 of a pump, compressor or other engine is shown. The inner and outer walls of the cylinder provide therebetween chambers 4 for the water of the cooling system. The walls have aligned perforations at 5 and 6 opening into a valve chamber 7, perforation 6 in the outer wall being the larger to permit the insertion and removal of a valve unit or assembly A. The unit closes the perforation 5 in the inner wall of the cylinder and a closure in the form of a cap 8 is provided for perforation 6 in the outer wall, the closure being held in place by any suitable means, such as cap screws 9. A gasket 10 may be placed under cap 8 to produce a tight seal. Between closure 8 and valve assembly A suitable means are provided for maintaining the valve assembly in tight engagement with the inner wall of a compressor. In the present instance a heavy coil spring 11 is provided for this purpose.

Valve assembly A comprises a seat member 14, a keeper member 15, a valve proper 16 of the annular plate or disk type, a valve spring 17, a buffer spring 18, and a stud 19 with its castle nut 20 and cotter pin 21 for maintaining the aforesaid elements in assembled relation. The head of stud 19 seats in a central opening in seat member 14, extends through an axial bore in keeper 15, and its nut 20 engages the outer portion of keeper 15, as indicated. Seat member 14 is circular in form having a portion telescoping within perforation 5 of the cylinder wall and an annular projecting flange 14$^a$ which engages the cylinder wall. Seat member 14 has an annular portion 14$^b$ projecting above the plane of flange 14$^a$ to provide the seat for plate valve 16 and has a series of openings 14$^c$ controlled by valve 16. Keeper 15 has a reduced lower end fitting in a central depression in seat member 14. Portions of keeper member 15 are cut away axially at intervals circumferentially thereof as indicated at 15$^a$ to facilitate the passage of fluid when valve 16 is opened, the uncut portions serving as guides for valve 16 in its movement toward and away from its seat. The portion of keeper 15 remote from seat member 14 is enlarged by a series of stepped annular projections 15$^b$ and 15$^c$, which provide shoulders engaged by springs 17 and 18 respectively. As shown springs 17 and 18 are nested and encircle keeper 15, spring 17 being interposed between valve 16 and the shoulder provided by projection 15$^b$ yieldingly to maintain the valve on its seat. Buffer spring 18 abuts the shoulder provided by step projection 15$^c$ and is secured to projection 15$^b$ in any suitable manner so as to retain its free end normally in spaced relation with valve 16 for the purpose of cushioning the valve on its opening movement. One arrangement for securing buffer spring 18 to the keeper is to have the upper portion of the spring engage projection 15$^b$ with a press fit. For this purpose the peripheral wall of projection 15$^b$ may incline inwardly to a slight extent, as shown, as it approaches the shoulder formed by projection 15$^c$.

Valve assembly A is designed and intended to provide as little obstruction as possible to the movement of the fluid controlled thereby. To this end all portions of the assembly above flange 14$^a$ of the seat member are wholly within a projection of that portion of the seat member which telescopes within the cylinder opening. Hence, when plate valve 16 lifts to uncover openings 14$^c$ the fluid can pass outwardly without being obstructed in any manner by any portion of either seat member 14 or keeper member 15. Any portion of the fluid which passes inwardly toward the keeper member passes through the cut away openings 15ᵃ and out between the coils of springs 17 and 18.

While a preferred form of the invention has been herein shown and described, it is to be understood that the invention is not limited to the specific details thereof, but covers all changes, modifications, and adaptations within the scope of the appended claims.

I claim as my invention:

1. A valve unit or assembly comprising a seat member, a plate valve arranged to fit the seat on said member, a keeper member engaging said seat member and forming a guide for said valve, an annular projection upon said keeper member providing a shoulder above said valve, a spring interposed between said shoulder and said valve for yieldingly maintaining the latter on its seat, a second annular projection above and beyond said first projection, and a buffer spring beneath said second projection and secured to said first projection, the free end of said buffer spring being normally out of contact with said valve.

2. A valve unit or assembly comprising a seat member, a plate valve arranged to fit the seat on said member, a keeper member engaging said seat member and forming a guide for said valve, said keeper member having stepped projections above and overhanging said valve, and nested springs encircling said keeper member and engaging said respective stepped projections, one of said springs being in engagement with said valve yieldingly to maintain it upon its seat while the other spring is normally disposed out of contact with said valve.

3. A valve unit or assembly comprising a member arranged to fit within an opening in the cylinder wall of a pump or compressor and having a flange to engage said wall, said member providing an annular valve seat and having no portion extending above said seat, a plate valve on said seat, a keeper member engaging said seat member within said seat only and providing an annularly spaced series of guide projections for maintaining said valve centered relative to its seat during its movement from and back to said seat, stepped annular projections on said keeper member beyond said guide projections, and nested valve and buffer springs engaging said projections.

4. A valve unit or assembly comprising a member arranged to fit within an opening in the cylinder wall of a pump or compressor and having a flange to engage said wall, said member providing an annular valve seat on the uppermost portion thereof, a plate valve on said seat, a keeper member engaging said seat member within said seat and providing an annularly spaced series of guide projections for maintaining said valve centered relative to its seat during its movement from and back to said seat, stepped annular projections on said keeper member remote from said valve but overhanging the latter, and nested valve and buffer springs engaging said last named projections, the buffer spring being secured to one of said last named projections and having a free end normally out of contact with said valve but arranged to cushion the opening movement of the latter.

5. A valve unit or assembly for pumps, compressors and the like comprising a seat member having a portion arranged to fit within the pump or cylinder opening, a plate valve arranged to fit the seat on said member, a keeper engaging said seat member and forming a guide for said valve, a plurality of resilient members operable independently for yieldingly maintaining said valve on its seat and for cushioning its movement, and means for maintaining said parts in assembled relation, all portions of said unit above said valve seat being within a projection of said portion of said seat member to provide free and unrestricted movement of the fluid controlled by said unit.

6. A keeper member for valve units or assemblies utilizing an annular plate valve, said member having a reduced end to form a central guide for the valve, said end being cut away at intervals to permit free movement of the fluid controlled by the valve, said member being enlarged beyond its reduced end by a series of stepped annular projections providing abutment seats for a series of nested springs for the valve.

Signed by me at Franklin, county of Venango, State of Pennsylvania, this 1st day of February, 1928.

JULIUS C. MOODY.